(12) United States Patent
Akiyama et al.

(10) Patent No.: US 7,079,152 B2
(45) Date of Patent: Jul. 18, 2006

(54) IMAGE DATA PROCESSING METHOD AND APPARATUS, STORAGE MEDIUM PRODUCT, AND PROGRAM PRODUCT

(75) Inventors: Yuji Akiyama, Kanagawa (JP); Makoto Torigoe, Tokyo (JP); Manabu Yamazoe, Tokyo (JP); Ryosuke Iguchi, Kanagawa (JP); Takashi Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 10/236,981

(22) Filed: Sep. 9, 2002

(65) Prior Publication Data

US 2003/0052895 A1    Mar. 20, 2003

(30) Foreign Application Priority Data

Sep. 18, 2001  (JP)  ............................... 2001-283193

(51) Int. Cl.
*G09G 5/02*    (2006.01)

(52) U.S. Cl. ........................ 345/589; 345/590; 345/602

(58) Field of Classification Search ................ 345/589, 345/590, 600, 601, 602, 604, FOR. 172
See application file for complete search history.

(56) References Cited

U.S. PATENT DOCUMENTS

| 5,500,921 A * | 3/1996 | Ruetz ........................ 358/1.9 |
| 6,225,974 B1 * | 5/2001 | Marsden et al. ............ 345/590 |
| 2002/0021458 A1 | 2/2002 | Saito et al. ................. 358/515 |

OTHER PUBLICATIONS

Michael Stokes, Matthew Anderson, Srinivasan Chandrasekar, and Ricardo Motta, A Standard Default Color Space for the Internet—sRGB, [online], Nov. 5, 1996 [retrieved on Mar. 31, 2005]. Retrieved via Internet:<http://www.w3.org/Graphics/Color/sRGB.html>.*

Sun Microsystems, Inc., Programmer's Guide to the JavaTM 2D API, JavaTM 2 SDK, Standard Edition, 1.4 version, [Online], Apr. 24, 2001 [Retrieved on Mar. 31, 2005]. Retrieved via Internet:<URL:http://java.sun.com/j2se/1.5.0/docs/guide/2d/spec/j2d-color.html>.*

* cited by examiner

*Primary Examiner*—Matthew C. Bella
*Assistant Examiner*—G. F. Cunningham
(74) *Attorney, Agent, or Firm*—Fitzpatrick, Cella, Harper & Scinto

(57) ABSTRACT

When printing image data obtained by an input device, the present invention is intended to effectively utilize the color reproduction area of the printer. An image data processing method of the present invention comprises the steps of scale-down shifting a first color space point outside a maximum color reproduction area of an output unit to a second color space point within the maximum color reproduction area of the output unit; computing an amount of shift by which the first color space point is shifted to the second color space point; converting the second color space point to a third color space point within a color reproduction area smaller than the maximum color reproduction area of the output unit; and outputting an image to the output unit using image data obtained by scale-up shifting the third color space point to a fourth color space point within the maximum color reproduction area of the output unit based on the computed shift amount.

8 Claims, 9 Drawing Sheets

FIG. 4

| INPUT R₀G₀B₀ | | | OUTPUT R₁G₁B₁ | | |
|---|---|---|---|---|---|
| 0 | 0 | 0 | a1 | a2 | a3 |
| 0 | 0 | 16 | b1 | b2 | b3 |
| ⋮ | ⋮ | ⋮ | ⋮ | ⋮ | ⋮ |
| 128 | 64 | 16 | c1 | c2 | c3 |
| ⋮ | ⋮ | ⋮ | ⋮ | ⋮ | ⋮ |
| 255 | 255 | 255 | d1 | d2 | d3 |

FIG. 5

| INPUT $R_0G_0B_0$ | | | OUTPUT $R_1G_1B_1$ | | |
|---|---|---|---|---|---|
| −32 | −32 | −32 | z1 | z2 | z3 |
| ⋮ | | | ⋮ | | |
| 0 | 0 | −16 | y1 | y2 | y3 |
| 0 | 0 | 0 | a1 | a2 | a3 |
| 0 | 0 | 16 | b1 | b2 | b3 |
| ⋮ | | | ⋮ | | |
| 128 | 64 | 16 | c1 | c2 | c3 |
| ⋮ | | | ⋮ | | |
| 255 | 255 | 255 | d1 | d2 | d3 |
| 255 | 255 | 271 | e1 | e2 | e3 |
| ⋮ | | | ⋮ | | |
| 320 | 320 | 320 | f1 | f2 | f3 |

- 501: first section (−32,−32,−32 to 0,0,−16)
- 500: middle section (0,0,0 to 255,255,255)
- 502: last section (255,255,271 to 320,320,320)

IMAGE DATA PROCESSING METHOD AND APPARATUS, STORAGE MEDIUM PRODUCT, AND PROGRAM PRODUCT

BACKGROUND OF THE INVENTION

1. Field of the Invention

The present invention relates to an image data processing method and apparatus, a storage medium product, and a program product.

2. Description of the Related Art

Recently, with an improvement of performance and more widespread use of input devices such as digital still cameras, digitization of photographic images has become easier and opportunities of handling photograph-like images as digital data on, particularly, personal computers have increased. In addition, it has also become possible to process and edit photograph-like images on personal computers using various kinds of application software.

On the other hand, the full-color hard copy technology has also rapidly developed. Particularly, in the ink jet printing technology, print quality has improved to a level comparable to that of silver-salt photographs with development of a technique for reducing a particulate texture attributable to ink dots. Then, the ink jet printing technology has received greater popularity because it has not only improved image quality, but also is a comparatively simple printing method.

Image data taken in by input devices such as digital still cameras is recorded in predetermined storage means in various signal forms and formats.

In the case of digital still cameras, the JPEG format is used for recording most images and images are stored in the form of luminance/color-difference data (YCbCr data).

While the data form widely used in general is RGB data, the relationship expressed by the following formulae in conformity with ITU-R BT.601 exists between RGB data and YCbCr data:

$Y=0.299 \times R+0.587 \times G+0.114 \times B$ $Cb=(-0.299 \times R-0.587 \times G+0.886 \times B) \times 0.564+k$ $Cr=(0.701 \times R-0.587 \times G-0.114 \times B) \times 0.713+k$    Formulae 1-1

$R=Y+((Cr-k) \times 1.4020)$ $G=Y-((Cb-k) \times 0.3441)-((Cr-k) \times 0.7139)$ $B=Y+((Cb-k) \times 1.7718)$    Formulae 1-2 wherein each of Cb and Cr takes a positive and negative value, each of R, G and B takes a value ranging from 0 to 255 when data is handled as an 8-bit value, and k is a value of 128.

Further, when YCbCr data is converted to RGB data, a converted data may take a value other than 0 to 255, and therefore a saturation process is executed such that values less than 0 are clipped to 0 and values larger than 255 are clipped to 255.

In general, RGB data is processed in 8 bits for each color. Accordingly, when image data is displayed on a display device such as a CRT monitor, colors represented by data having values of 0 to 255 for each of RGB can be only reproduced.

As a color space used for color matching, there is an sRGB color space (IEC 61966-2-1, ITU-R BT.709), which is specified in consideration of characteristics of a CRT monitor.

Then, it is a recent trend to handle values of 0 to 255 for each of RGB as sRGB color-space data because the sRGB color space has become a standard color space for universal operating systems used in personal computers for the purpose of color standardization among devices.

However, an actual scene has of course a larger color reproduction area than a display device, such as a CRT monitor, and in some regions of the color space a color reproduction area reproduced by a printer device is larger than that reproduced by a display device, such as a CRT monitor.

FIG. 9 is an xy chromaticity diagram showing color reproduction areas. In FIG. 9, numeral 901 denotes the sRGB color space, and 902 denotes arbitrary color points that can be reproduced by a printer.

The sRGB color space employed as a standard color space in many cases does not always completely involve the color reproduction areas of input and output devices. In other words, as seen from FIG. 9, a part of the color area reproducible by the printer is lost when an image is processed as sRGB color-space data.

In digital still cameras, therefore, a color signal obtained by a sensor is subjected to a predetermined process for mapping to the sRGB color space and then conversion to YCrCb data. In some cases, however, values of sRGB data are equivalently extended to a negative value less than 0 or a value larger than 255 for improving color reproducibility of display devices other than ones using the sRGB color space. A maximum color area in those cases is given as a color area defined by limitations ($0 \leq Y \leq 255$ and $-128 \leq CbCr \leq 127$) imposed on 8-bit YCbCr signals, and the color reproduction area is sometimes extended to a full limit of the maximum color area.

As described above, when image data is converted to the sRGB color space, some colors reproducible by a printer are lost. In such a case, when image data input from an input device is output to a display device, such as a CRT monitor, after conversion to sRGB, the image data is reproduced as a satisfactory image free from defects when viewed on a monitor screen. However, when the image data converted to sRGB and displayed on the CRT monitor or the like is printed out by a printer, proper colors are not reproduced because information regarding colors contained in an original image (image data input from the input device) is partly lost in the process of displaying the image on the CRT monitor (i.e., upon conversion to sRGB).

On the other hand, when image data input from an input device is printed out after being converted to the extended color space 903, shown in FIG. 9, so as to fully involve the color reproduction area of a printer, printing can be performed using information contained in an original image. However, the image data converted to the extended color space cannot be properly displayed when output to a display device, such as a CRT monitor, because the extended color space is not a color space in consideration of characteristics of the CRT monitor.

SUMMARY OF THE INVENTION

In view of the state of the art mentioned above, it is an object of the present invention to provide an image data processing method and apparatus, which can (1) satisfactorily display image data obtained from an input device on a CRT monitor, and (2) print the input image data with high quality by converting it to image data allowing the color reproduction area of a printer to be effectively utilized. The present invention also provides a storage medium product and a program product for practically implementing the image data processing method and apparatus.

To achieve the above object, the image data processing method and apparatus of the present invention has features given below.

According to one aspect of the present invention, an image data processing method comprises the steps of scale-down shifting a first color space point outside a maximum color reproduction area of an output unit to a second color space point within the maximum color reproduction area of the output unit; computing an amount of shift by which the first color space point is shifted to the second color space point; converting the second color space point to a third color space point within a color reproduction area smaller than the maximum color reproduction area of the output unit; and outputting an image to the output unit using image data obtained by scale-up shifting the third color space point to a fourth color space point within the maximum color reproduction area of the output unit based on the computed shift amount.

According to another aspect of the present invention, an image data processing method comprises the steps of determining whether image data takes a value outside a preset area; if a determination result in the above step shows that the image data is outside the preset area, scale-down shifting a first color space point outside a maximum color reproduction area of output means to a second color space point within the maximum color reproduction area of the output unit; computing an amount of shift by which the first color space point is shifted to the second color space point; converting the second color space point to a third color space point within a color reproduction area smaller than the maximum color reproduction area of the output unit; and outputting an image to the output unit using image data obtained by scale-up shifting the third color space point to a fourth color space point within the maximum color reproduction area of the output unit based on the computed shift amount.

Further objects, features and advantages of the present invention will become apparent from the following description of the preferred embodiments with reference to the attached drawings.

BRIEF DESCRIPTION OF THE DRAWINGS

FIG. 4 shows a configuration of a look-up table for correction of color matching in one embodiment of the present invention.

FIG. 5 shows a configuration of a look-up table for correction of color matching in another embodiment of the present invention.

DESCRIPTION OF THE PREFERRED EMBODIMENTS

Embodiments of the present invention will be described below in detail with reference to the drawings.

(First Embodiment)

Figure 1:
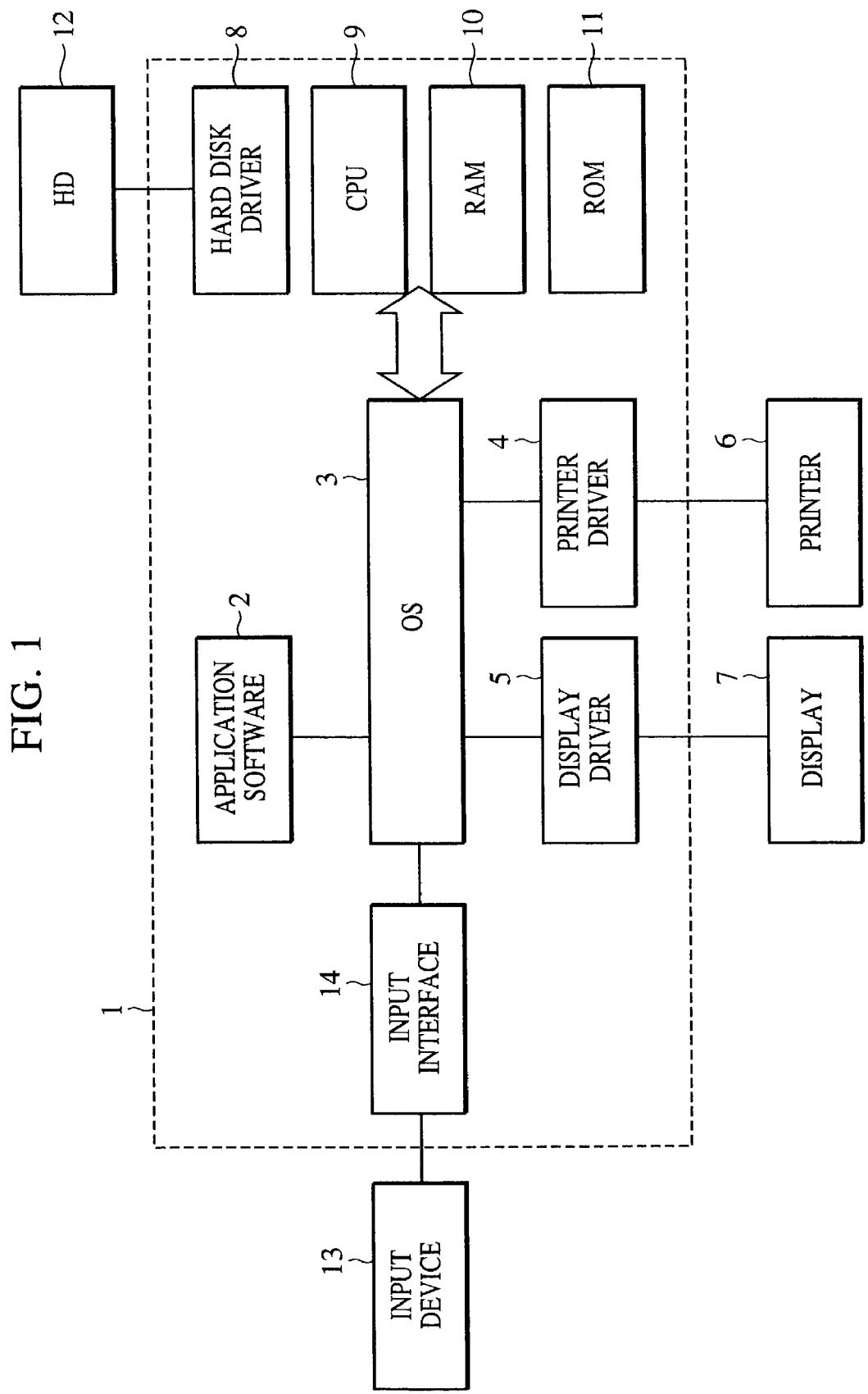
FIG. 1 is a block diagram showing a schematic configuration of an image data processing system according to one embodiment of the present invention.

FIG. 1 is a block diagram showing a schematic configuration of an image data processing system according to one embodiment of the present invention.

This system mainly comprises a host computer 1, an ink jet printer 6, and a display 7. The ink jet printer 6 and the display 7 are connected to the host computer 1 in a two-way communicating manner.

The host computer 1 includes an OS (Operating System) 3 and application software 2, such as photo-retouch and layout, for executing respective processing under management of the OS 3. Also, the host computer 1 includes, in the form of software, a printer driver 4 for processing a group of various drawing commands (e.g., an image drawing command, a text drawing command, and a graphic drawing command), which are issued from the application software 2 and represent an output image, thereby creating printing data, and a display driver 5 for processing a group of various drawing commands, which are also issued from the application software 2, thereby displaying an image on the display 7.

Further, the host computer 1 includes, as various hardware units operable by the above-mentioned software, a central processing unit (CPU) 9, a hard disk driver 8, a random access memory (RAM) 10, a read only memory (ROM) 11, an input interface 14, etc. More specifically, the CPU 9 executes signal processing required in processes executed by the above-mentioned software. A hard disk (HD) 12 driven by the hard disk driver 8 stores not only image data photographed by a digital still camera, for example, but also the above-mentioned software. The ROM 11 also stores the above-mentioned software in advance so that desired one of the software is read out as required. The RAM 10 is used as, for example, a work area for execution of the signal processing by the CPU 9. Further, an input entered from an input device 13, such as a mouse or a keyboard, is input to the OS 3 through the input interface 14 and is subjected to the processing executed by the OS 3.

Image data from an image input device, e.g., a digital still camera, can be transferred to the hard disk (HD) 12 in the host computer 1 through the input interface 14 by using a reader for a memory disk or a memory card, cable connection, or infrared communication or wireless communication. As a matter of course, a digital still camera and the host computer 1 may be interconnected via cable connection, infrared communication or wireless communication, and image data may be directly read and processed from a memory card or a built-in memory held in an image input device, e.g., a digital still camera, without transferring the image data to the hard disk (HD) 12 in the host computer 1.

In the system constructed as described above, a user is able to create, based on an image displayed on the display 7 by the application software 2, image data made up of, e.g., text data classified into a text, such as characters, through the processing in accordance with the application, graphics data classified into graphics, such as figures, and image picture data classified into a photographic image photographed by a digital still camera, for example.

When printing-out of the thus-prepared image data is instructed by the user, the application software 2 gives a printing-out request to the OS 3, and issues, to the OS 3, a group of drawing commands representing an output image and constructed such that graphics data portions are represented by graphics drawing commands and image picture data portions are represented by image drawing commands. Correspondingly, the OS 3 receives the printing-out request from the application software 2 and issues the group of drawing commands to the printer driver 4 corresponding to the printer 6 that is appointed to make the printing-out. Generally, the image drawing command is represented using 8-bit data for each color in many cases.

The printer driver 4 processes the printing-out request and the group of drawing commands both input from the OS 3, creates printing data in the form printable by the printer 6, and transfers the created data to the printer 6. When the printer 6 is a raster printer, the printer driver 4 successively executes an image correction process for the drawing commands from the OS 3, and rasterises the drawing commands in an RGB 24-bit page memory (8 bits for each of R, G and B). After rasterising all of the drawing commands, the contents of the RGB 24-bit page memory are converted to the data form printable by the printer 6, e.g., CMYK data, and then transferred to the printer 6.

Display of an image on the display 7 is executed in a similar manner. More specifically, the OS 3 issues the group of drawing commands to the display driver 5. The display driver 5 converts the group of drawing commands to signal data in the form displayable on the display 7 and then transfers the signal data to the display 7.

While values larger than 8-bit ones are used in some of the application software and various computing processes, those values larger than 8-bit ones cannot be sometimes used in drawing instructions because of, e.g., restrictions imposed on the OS 3. RGB values handled in consideration of versatility fall within the range of 8-bit values for each color in many cases.

Figure 2:
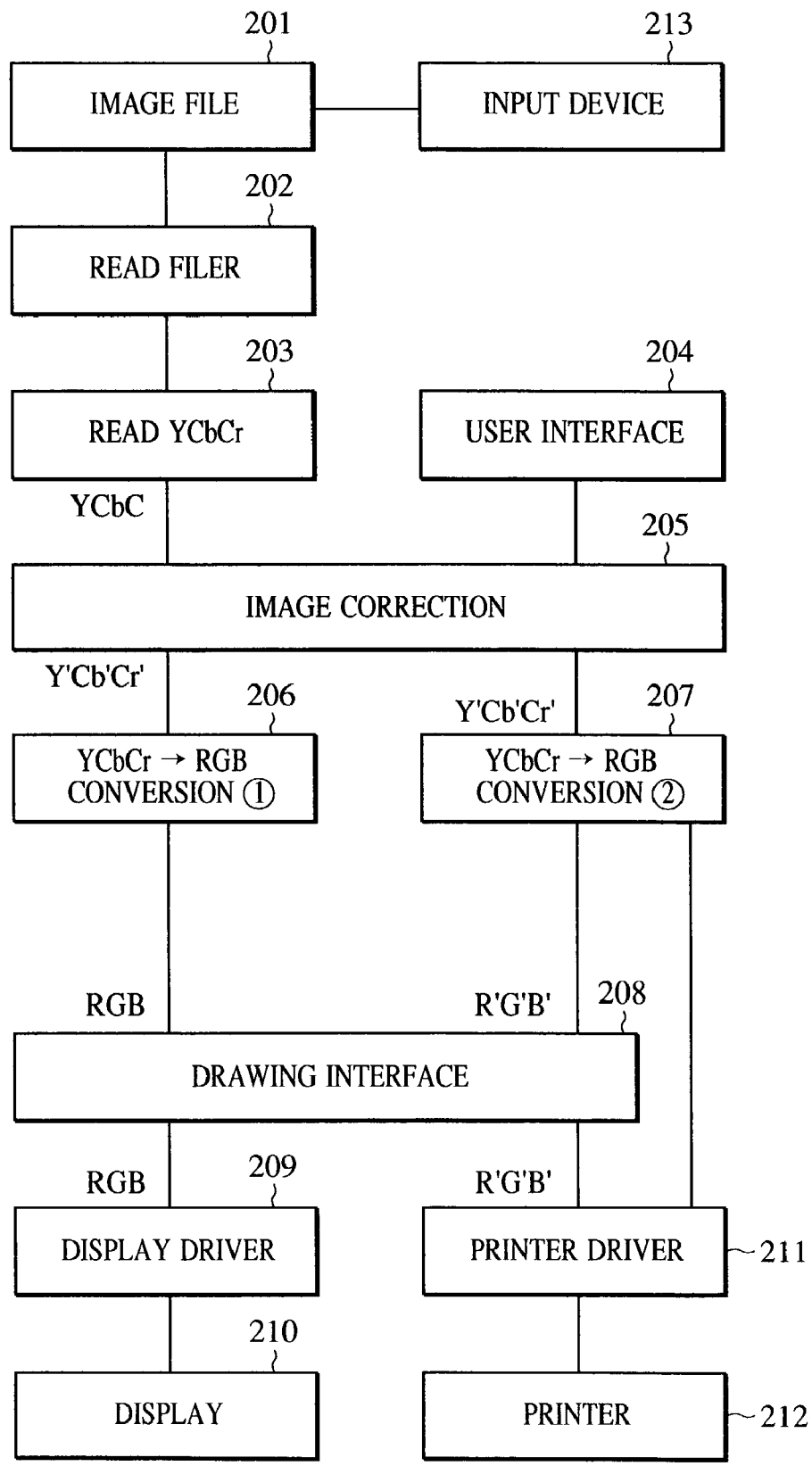
FIG. 2 is a block diagram showing an outline of image data processing executed by application software in one embodiment of the present invention.

FIG. 2 is a block diagram showing an outline of image data processing executed by application software in one embodiment of the present invention.

The following description is made of details of processing in which YCbCr data can be read as image data.

An image file 201, in which image data has been recorded by an input device 213, e.g., a digital still camera, is read by a file reading section 202.

The reading of the image file 201 can be performed via the host computer through the input interface by using a reader for a memory disk or a memory card, cable connection, or infrared communication or wireless communication. As a matter of course, the input device 213, e.g., a digital still camera, and the host computer may be interconnected via cable connection, infrared communication or wireless communication, and image data may be directly read and processed from a memory card or a built-in memory held in the image input device 213, e.g., a digital still camera.

Image data is recorded in various formats and is often recorded in compressed form for reducing the data amount. The file reading section 202 has the function of analyzing the data form and decompressing the compressed data to obtain desired image data.

Luminance/color-difference data (YCbCr data) is read by a YCbCr reading section 203 and then converted to Y'Cb'Cr' data in an image correction processing section 205 through correction processing for brightness, contrast, color balance, etc. The contents of the correction processing are instructed from a user interface 204. By performing the image conversion of image data in the form of YCbCr data, the correction processing can be made on proper color reproduction information of original image data without being affected by data loss that may occur upon conversion to 8-bit RGB data.

The Y'Cb'Cr' data having been subjected to the image correction processing is converted to RGB data in a YCbCr-to-RGB converting section (1) 206. The conversion to RGB data is performed based on the above-mentioned formulae 1-2. At this time, since the RGB data is handled as 8-bit data for each color, a saturation process is executed such that values less than 0 are clipped to 0 and values larger than 255 are clipped to 255.

A color space of the converted RGB data is handled as an sRGB color space. In other words, image data in the standardized sRGB color space is obtained.

On the other hand, the Y'Cb'Cr' data is converted to 8-bit R'G'B' data in a YCbCr-to-RGB converting section (2) 207. The R'G'B' data is data based on a color space equivalent to the color reproduction area of the printer, and enables printing to be performed with full utilization of the color reproduction area reproducible by the printer. Details of the conversion from Y'Cb'Cr' data to R'G'B' data will be described later (with reference to FIG. 3)

In the case employing the R'G'B' data, the so-called color matching correction, which has been performed in conventional printers, is not performed in a printer driver 211.

The converted RGB data is sent to a display driver 209 through a drawing interface 208 and then displayed on a display 210.

On the other hand, the converted R'G'B' data is sent to the printer driver 211 through the drawing interface 208 and then printed out by a printer 212.

Through the above-described conversion, RGB data prepared as sRGB color-space data is provided to the display 210, and R'G'B' data prepared as data based on an extended color space equivalent to the color reproduction area of a relevant printer is provided to the printer 212, whereby image data suitable for respective devices can be obtained. As a result, color characteristics of an original image can be output and reproduced while minimizing loss of colors.

Figure 3:
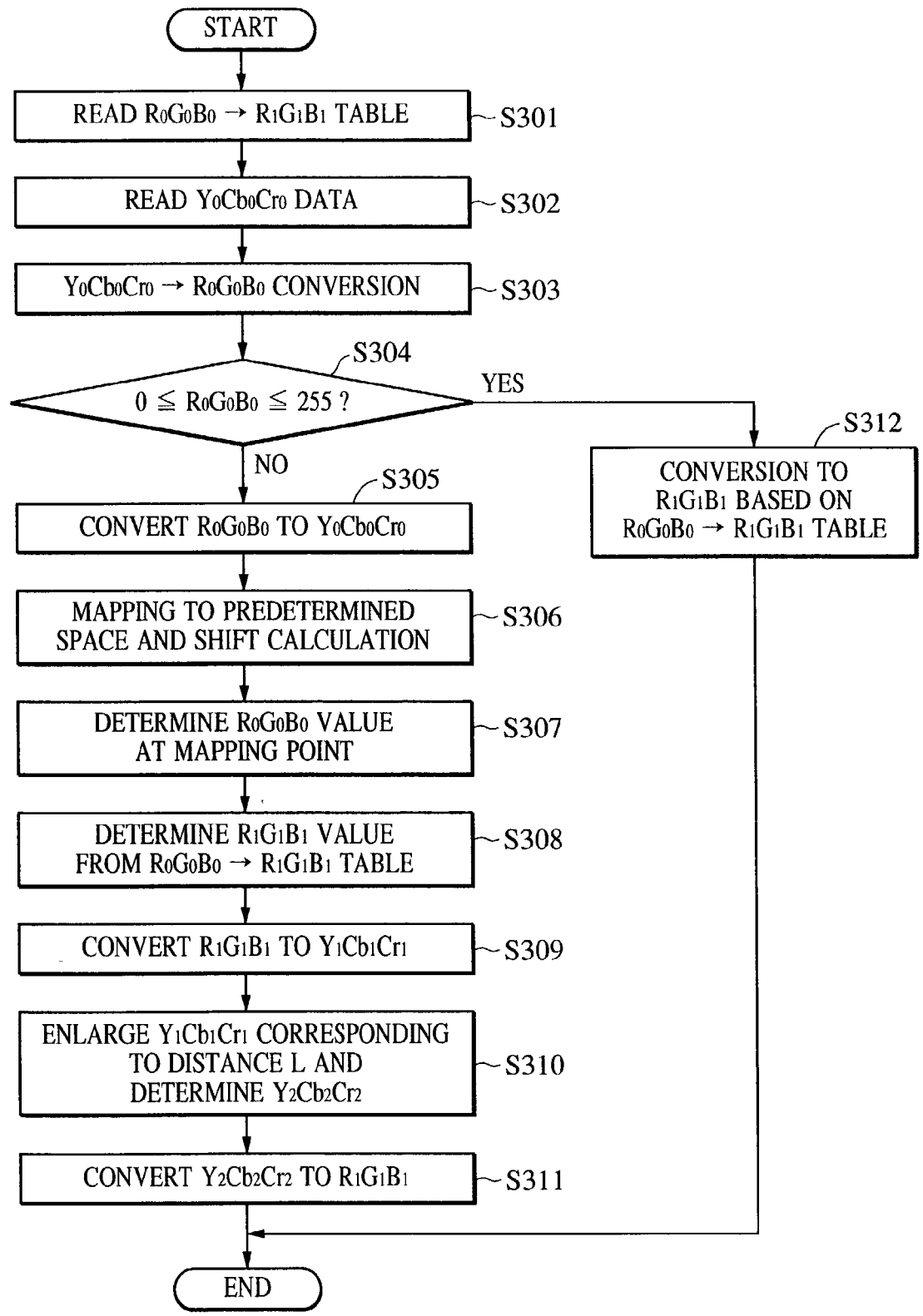
FIG. 3 is a flowchart of a process for conversion to data based on a color space equivalent to the color reproduction area of a printer in one embodiment of the present invention.

FIG. 3 is a flowchart of a process (207 in FIG. 2) for conversion to data based on a color space equivalent to the color reproduction area of a printer in one embodiment of the present invention.

First, an $R_0G_0B_0 \rightarrow R_1G_1B_1$ table is read in step S301.

Generally, the printer driver 211 converts RGB data into CMYK data, i.e., the printable form, based on the following formulae 2-1 and 2-2, and sends the CMYK data to the printer:

$$C_0 = 255 - R$$

$$M_0 = 255 - G$$

$$Y_0 = 255 - B \hspace{2cm} \text{(Formulae 2-1)}$$

$$K = min(C_0, M_0, Y_0)$$

$$C = C_0 - K$$

$$M = M_0 - K$$

$$Y = Y_0 - K \hspace{2cm} \text{(Formulae 2-2)}$$

Each of R, G, B, C, M, Y and K in the above formulae 2-1 and 2-2 takes an 8-bit value ranging from 0 to 255.

Instead of the arithmetic conversion using the above formulae 2-1 and 2-2, the conversion from RGB to CMYK may be performed using a lookup table representing the relationship between RGB values and CMYK values.

FIG. 4 shows one example of the $R_0G_0B_0 \rightarrow R_1G_1B_1$ table. This $R_0G_0B_0 \rightarrow R_1G_1B_1$ table is a lookup table for color matching correction, in which $R_0G_0B_1$ and $R_1G_1B_1$ are correlated with each other such that the color originally intended by $R_0G_0B_0$ data substantially matches with the color resulting when $R_1G_1B_1$ data is converted to CMYK data and then printed out by the printer.

The lookup table holds, for example, the discrete relationship between $R_0G_0B_0$ and $R_1G_1B_1$ corresponding to 17×17×17 points resulting from dividing values of 0 to 255 in units of 16 steps for each color. Values between 17 points for each of RGB are computed by interpolation using the respective values of $R_0G_0B_0$ and $R_1G_1B_1$ at the 17×17×17 points.

As shown in FIG. 4, when values of $R_0G_0B_0$ are (0, 0, 0), converted values of $R_1G_1B_1$ are (a1, a2, a3). Likewise, when values of $R_0G_0B_0$ are (0, 0, 16), converted values of $R_1G_1B_1$ are (b1, b2, b3), and when values of $R_0G_0B_0$ are (128, 64, 16), converted values of $R_1G_1B_1$ are (c1, c2, c3). When values of $R_0G_0B_0$ are (255, 255, 255), converted values of $R_1G_1B_1$ are (d1, d2, d3).

The values of (a1, a2, a3), (b1, b2, b3), (c1, c2, c3) and (d1, d2, d3) are ones ranging from 0 to 255 which are defined, as mentioned above, such that the color originally intended by $R_0G_0B_0$ data substantially matches with the color resulting when $R_1G_1B_1$ data is converted to CMYK data and then printed out by the printer.

Also, since the $R_0G_0B_0 \rightarrow R_1G_1B_1$ table shown in FIG. 4 is prepared by on an assumption of regarding the $R_0G_0B_0$ data as sRGB color-space data, the values of the $R_1G_1B_1$ data are set such that color matching is achieved between the results of printing-out and sRGB.

The above-described color matching correction is usually performed in the printer driver 211, and therefore the $R_0G_0B_0 \rightarrow R_1G_1B_1$ table is held in the printer driver 211 for the printer 212.

Accordingly, the $R_0G_0B_0 \rightarrow R_1G_1B_1$ table is read from the printer driver 211. However, the table is not always required to be read from the printer driver 211, and can be read from any predetermined place where it is prepared.

Then, $Y_0Cb_0Cr_0$ data is read in step S302, and the read $Y_0Cb_0Cr_0$ data is converted to $R_0G_0B_0$ data in step S303. This conversion is performed based on the above-mentioned formulae 1-2, and converted data can take values other than 8-bit ones. In other words, the $R_0G_0B_0$ data can take a value less than 0 or larger than 255. At this time, the saturation process of clipping the $R_0G_0B_0$ data less than 0 or larger than 255 to values falling within the range of 0 to 255 is not performed.

In step S304, it is determined whether the $R_0G_0B_0$ data converted in step S303 satisfies $0 \leq R_0 \leq 255$, $0 \leq G_0 \leq 255$ and $0 \leq B_0 \leq 255$ (hereinafter expressed as $0 \leq R_0G_0B_0 \leq 255$ for brevity). If the $R_0G_0B_0$ data satisfies $0 \leq R_0G_0B_0 \leq 255$, the process flow goes to step S312 in which the $R_0G_0B_0$ data is converted to $R_1G_1B_1$ data using the $R_0G_0B_0 \rightarrow R_1G_1B_1$ table.

As a result of the determination in step S304 as to whether the $R_0G_0B_0$ data converted in step S303 satisfies $0 \leq R_0G_0B_0 \leq 255$, if the $R_0G_0B_0$ data does not satisfy $0 \leq R_0G_0B_0 \leq 255$, the process flow goes to step S305 in which the $R_0G_0B_0$ data is converted to the original $Y_0Cb_0Cr_0$ data. This conversion is performed based on the above-mentioned formulae 1-1.

Then, in step S306, the $Y_0Cb_0Cr_0$ data is subjected to mapping (scale-down shift) to values in a YCbCr space expressible by 8-bit values for each color of RGB, and an amount of the shift (scale) L is computed.

Figure 6:
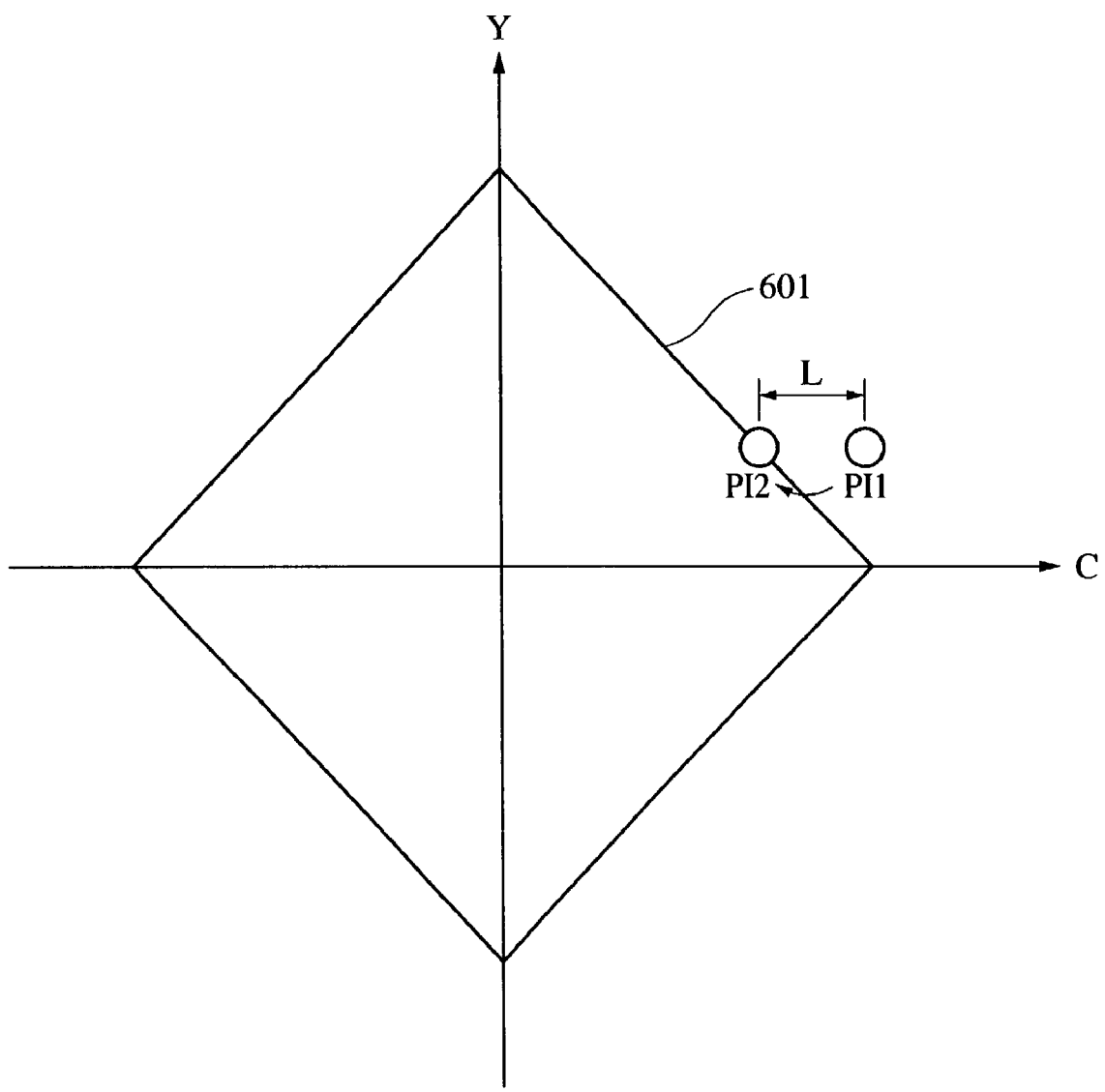
FIG. 6 is an explanatory view showing a conversion process on a YCbCr space in still another embodiment of the present invention.

FIG. 6 shows a YCbCr space. In FIG. 6, the vertical axis Y represents luminance, and the horizontal axis C represents hue and saturation. The illustrated graph represents a section at arbitrary values of Cb and Cr. A solid line 601 indicates an area expressible by 8-bit values for each color of RGB.

The YCbCr space indicated by the solid line 601 is obtained from the RGB values falling within the range of 0 to 255 based on the above-mentioned formulae 1-1; namely, it is obtained from combinations of the RGB values of 0 to 255. It can be therefore said that the YCbCr space indicated by the solid line 601 matches with the color reproduction space of the printer.

The $Y_0Cb_0Cr_0$ data converted in step S305 is given as, for example, a point PI1 outside the area expressible by 8-bit values for each color of RGB. Then, a shift point (mapping point) is determined for a shift from the PI1 point to a point PI2 within the area expressible by 8-bit values for each color of RGB on the YCbCr space shown in FIG. 6. Stated otherwise, for a shift from PI1 to PI2, the point PI2 providing the same hue while preserving the luminance of PI1 is computed as the mapping point. At this time, the shift amount (scale) L from PI1 to PI2 is computed.

Subsequently, $R_0G_0B_0$ values of the mapping point PI2 are determined in step S307. The computation from the YCbCr values of the mapping point PI2 to the $R_0G_0B_0$ values is performed based on the above-mentioned formulae 1-2.

Then, $R_1G_1B_1$ data is determined from the $R_0G_0B_0 \rightarrow R_1G_1B_1$ table in step S308.

Further, the $R_1G_1B_1$ data is converted to $Y_1Cb_1Cr_1$ data in step S309. This conversion from $R_1G_1B_1$ to $Y_1Cb_1Cr_1$ is performed based on the above-mentioned formulae 1-1.

Figure 7:
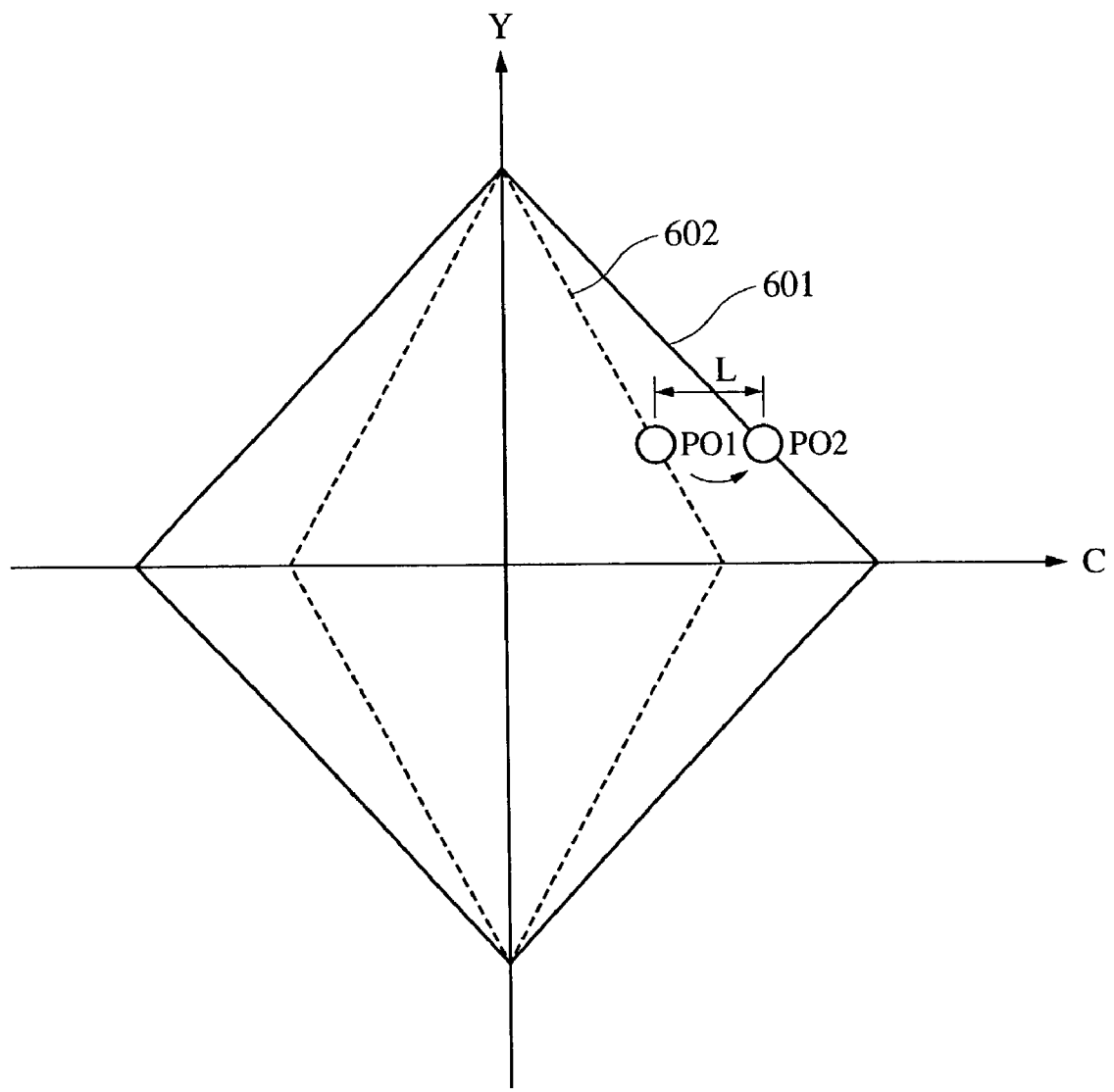
FIG. 7 is another explanatory view showing a conversion process on a YCbCr space in still another embodiment of the present invention.

FIG. 7 shows a YCbCr space. In FIG. 7, as with FIG. 6, the vertical axis Y represents luminance, and the horizontal axis C represents hue and saturation. The illustrated graph represents a section at arbitrary values of Cb and Cr. A solid line 601 indicates an area expressible by 8-bit values for each color of RGB. The YCbCr space indicated by the solid line 601 is obtained from the RGB values falling within the range of 0 to 255 based on the above-mentioned formulae 1-1; namely, it is obtained from combinations of the RGB values of 0 to 255. It can be therefore said that the YCbCr space indicated by the solid line 601 matches with the color reproduction space of the printer. On the other hand, a dotted line 602 represents an area reproducible when the printer performs color matching correction based on the $R_0G_0B_0$-to-$R_1G_1B_1$ table.

Since the $R_0G_0B_0$-to-$R_1G_1B_1$ table is prepared in consideration of that the color matching is performed on an assumption of regarding the $R_0G_0B_0$ data as sRGB color-space data, the YCbCr color-space area indicated by the dotted line 602 is narrower than the YCbCr color-space area indicated by the solid line 601.

Figure 9:
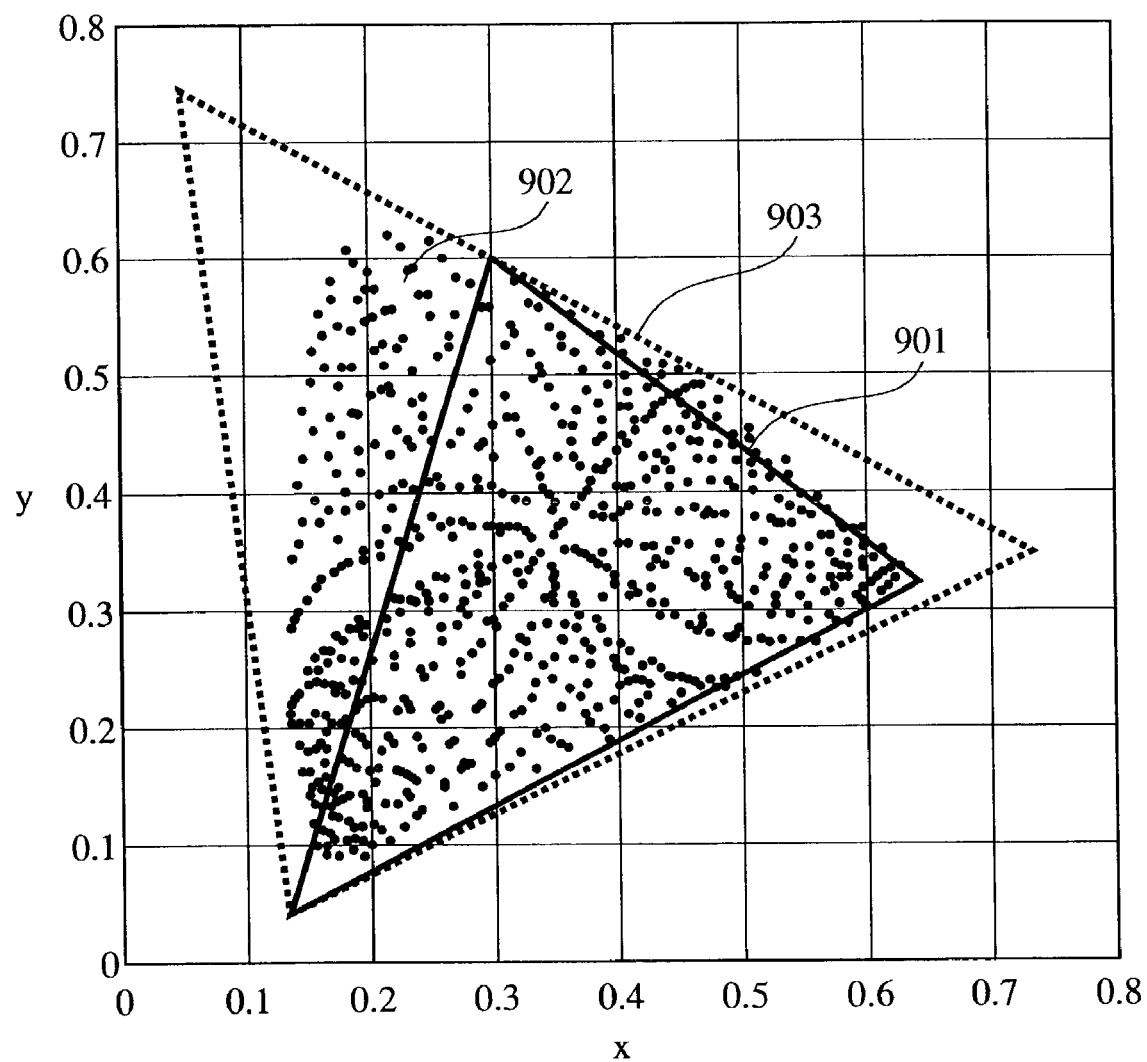
FIG. 9 is a chromaticity diagram showing color reproduction areas.

As described above in connection with the related art by referring to FIG. 9, the color reproduction area of the printer is larger than that reproducible using sRGB. With execution of the color matching, however, the $R_1G_1B_1$ values are not always prepared by using all values of 0 to 255. In other words, the $R_1G_1B_1$ values provide the color reproduction area narrower than that reproducible by the printer, and the performance of the printer is not fully utilized. For that reason, the $Y_1Cb_1Cr_1$ data determined in step S309 is subjected to signal conversion so that the dead capacity of the printer performance can be effectively utilized. More specifically, color reproducibility is improved by the following method to a full limit of the color reproducible area of the printer in consideration of the shift amount L determined in step S306.

In FIG. 7, PO1 is assumed to be one example point of the $Y_1Cb_1Cr_1$ data determined in step S309. The point PO1 is subjected to scale-up shift corresponding to the distance (scale) L (i.e., enlargement of the color reproduction area), thereby obtaining a point PO2. Then, $Y_2Cb_2Cr_2$ data at the point PO2 is determined.

In the above process, the point PO2 resulting from the area enlargement corresponding to the distance (scale) L may be sometimes positioned outside the area indicated by the solid line 601. In such a case, an outermost point, which contacts the solid line 601 upon shift of the point PO2 for the area enlargement, is defined as the point PO2. Alternatively, the point PO2 may be determined by setting a predetermined amount n and reducing an amount of enlargement as defined by L×n so that PO2 is kept within the area indicated by the solid line 601 depending on the distance (scale) L.

When enlarging the color reproduction area, as with the above scaling-down process, PO1 is shifted at the same hue while preserving the luminance. Assuming that the shift amount resulting when one of all data, which provides a maximum shift amount, is shifted to PO2 while preserving the same luminance and hue, is m, the predetermined amount n is given by n=m/L. As a result, one of all data, which provides the maximum shift amount, is shifted to a position on the solid line 601 while preserving the luminance and the hue, and other data is also shifted at the same shift rate as that at which the data providing the maximum shift amount is actually shifted.

Accordingly, all the data is shifted to the area within the solid line 601 while preserving the luminance and the hue.

The reason why PI2 determined in step S306 is subjected to the above-described enlarging process after being converted to PO1 through steps S307 to S309 resides in that the hue of the input point PI2 is not always the same as the hue of the output point PO1 because of the effect of the color matching process. More specifically, the input point PI2 is a theoretical value, whereas the output point PO1 is a point determined from the RGB values for causing the printer to print out the intended color. The hue printed out by the printer after being subjected to the processing using the $R_0G_0B_0 \rightarrow R_1G_1B_1$ table, which is prepared in consideration of preferred color reproducibility instead of absolute color matching, is not always in agreement with the theoretical hue.

For that reason, the process of determining the hue of the point PO1 within the dotted line 602 and then enlarging the color reproduction area toward the solid line 601 is executed so that the determined point PO2 provides a color smoothly continuing with the hue within the dotted line 602 (namely the same hue is preserved).

Finally, the $Y_2Cb_2Cr_2$ data at the point PO2 determined in step S310 is converted to $R_2G_2B_2$ data in step S311. This conversion is performed based on the above-mentioned formulae 1-2.

With this first embodiment, colors represented by the RGB values, which are obtained from the $Y_0Cb_0Cr_0$ data and fall within the range of 0 to 255, are reproduced as ones within the color reproduction area indicated by the dotted line 602 in FIG. 7. Also, colors represented by the RGB values, which are obtained from the $Y_0Cb_0Cr_0$ data and fall outside the range of 0 to 255, are reproduced as ones using the color reproduction area indicated by the solid line 601 in FIG. 7. As a result, an image can be printed while fully utilizing the color reproduction area of the printer.

Also, the above-described process imposes no effects upon the color reproduction performance achieved with the $R_0G_0B_0 \rightarrow R_1G_1B_1$ table prepared for the color matching.

Further, when printing an image with the system of this first embodiment, a part of information regarding colors contained in the original image, which has been lost in the past, is employed so that the image can be printed while effectively utilizing the full color reproduction area of the printer.

While the conversion is made on the YCbCr space data in this first embodiment, a utilizable color space is not limited to the YCbCr space. The above-described conversion process may be performed on image data based on other color spaces, such as HSV and L*a*b*, for fully utilizing the color reproduction area of the printer.

The system configuration of this first embodiment may be modified such that the above-described data processing is executed without using any personal computer by providing the data processing section 201 to 212, shown in FIG. 2, inside the printer. In such a case, image data can be read using a reading unit, e.g., a card reader provided in the printer, via a memory card. Alternatively, an input device, e.g., a digital still camera, can be connected to the printer via a wired cable, infrared communication or wireless communication, thus allowing image data to be read out of a detachable memory card or a built-in memory held in the input device.

In the above modification in which the data processing section is provided inside the printer, when a simple liquid crystal monitor is installed as a display in the printer, image data can be handled as different sets of color-space data separately, i.e., data used for display on the liquid crystal monitor and data used for printing.

The first embodiment has been described in connection with a digital still camera as one example of the input device, but the application field is not limited to the digital still camera. The present invention is also applicable to other input devices such as a digital video camera (digital cam coder), an image scanner, and a film scanner.

It is to be noted that the present invention is not limited to the above-described first embodiment, but can be variously modified without departing from the scope of the present invention.

(Second Embodiment)

Figure 8:
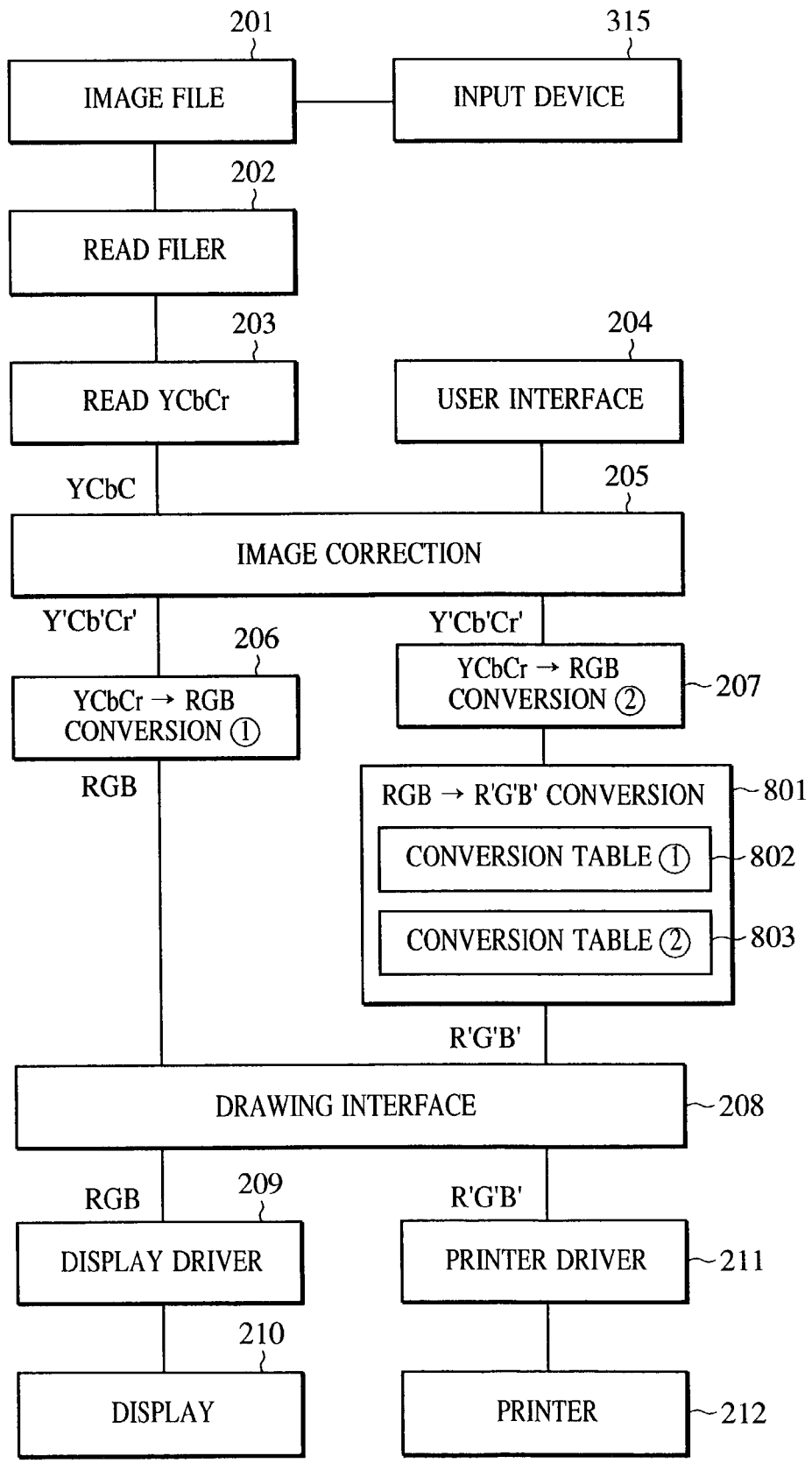
FIG. 8 is a block diagram showing an outline of image data processing executed by application software in still another embodiment of the present invention.

This second embodiment differs from the above first embodiment in that, in the system shown in FIG. 1, an image data processing configuration shown in FIG. 8, for example, is employed instead of the image data processing configuration shown in FIG. 2.

The following description is made of only the configuration and operation of this second embodiment which differ from those of the above first embodiment.

While the conversion to the R'G'B' data in the YCbCr-to-RGB converting section (2) 207 is implemented with computation in the above first embodiment, it is implemented using a conversion table in this second embodiment.

For executing the conversion using a table, an RGB-to-R'G'B' data converting section 801 is provided in this second embodiment.

A conversion table (1) 802 is in the form of a lookup table that is similar to that shown in FIG. 4 and employs values in the range of 0 to 255 as input $R_0G_0B_0$ values.

A conversion table (2) 803 is in the form of a lookup table constituted as shown in FIG. 5.

In FIG. 5, a standard section 500 is constituted by setting the same values as those used in the lookup table of FIG. 4. Extended sections 501, 502 set therein values corresponding to input $R_0G_0B_0$ values of less than 0 or larger than 255. Lookup tables in the extended sections 501, 502 are each completed by setting $R_0G_0B_0$ values in advance and then setting, as $R_1G_1B_1$ values, results of the computation made in the processing of steps S305 to S311 in the flowchart of FIG. 3 described above in connection with the first embodiment.

When all of image data resulting from processing of the conversion to RGB data made in the YCbCr-to-RGB converting section (2) 207 based on the above-mentioned formulae 1-2 is in the range of $0 \leq RGB \leq 255$, the conversion to R'G'B' data is performed using the conversion table (1). When the image data resulting from processing of the conversion to RGB data takes a value less than 0 or larger than 255, the conversion to R'G'B' data is performed using the conversion table (2).

With this second embodiment, when processing image data represented by the RGB values which are less than 0 or larger than 255 and do not fall within the range of 8-bit values, an image can be printed while fully utilizing the color reproducible area of the printer without causing no effects upon the color reproduction of data represented by the RGB values falling within the range of $0 \leq RGB \leq 255$.

Further, when printing an image with the system of this second embodiment, it is also possible to perform the image printing while effectively utilizing the full color reproduction area of the printer by utilizing a part of information regarding colors contained in the original image, which has been lost in the past.

It is to be noted that the present invention is not limited to the above-described second embodiment, but can be variously modified without departing from the scope of the present invention.

As with the above first embodiment, the system configuration of this second embodiment may be modified such that the above-described data processing is executed without using any personal computer by providing the data processing section 201 to 212 and 801 to 803, shown in FIG. 8, inside the printer. In such a case, image data can be read using a reading unit, e.g., a card reader provided in the printer, via a memory card. Alternatively, an input device, e.g., a digital still camera, can be connected to the printer via a wired cable, infrared communication or wireless communication, thus allowing image data to be read out of a detachable memory card or a built-in memory held in the input device.

In the above modification in which the data processing section is provided inside the printer, when a simple liquid crystal monitor is installed as a display in the printer, image data can be handled as different sets of color-space data separately, i.e., data used for display on the liquid crystal monitor and data used for printing.

This second embodiment has been described in connection with a digital still camera as one example of the input device, but the application field is not limited to the digital still camera. The present invention is also applicable to other input devices such as a digital video camera, an image scanner, and a film scanner.

As described above in detail, an image data processing method and apparatus can be provided in which when digital image data obtained by an input device, e.g., a digital still camera, is printed using a printer, the obtained image data is converted to image data enabling the color reproduction area of the printer to be effectively utilized, and a photographic image with high quality can be printed.

(Other Embodiments)

While the above-described embodiments include hardware, etc., similar functions can be realized with software for executing successive data processing steps in sequence. More specifically, a storage medium (or a recording medium), such as a CD, an MD, a memory card or an MO, which stores program codes of software for realizing the functions of the above-described embodiments, is supplied to a user. Then, the user sets the storage medium in a system or an apparatus, causing a computer (CPU or MPU) in the system or the apparatus to read and execute the program codes stored in the storage medium. The processing executed in the above-described embodiments can also be achieved in such a manner. In that case, the program codes read out of the storage medium serve in themselves to realize the functions of the above-described embodiments.

Also, the functions of the above-described embodiments are realized not only by a computer executing the program codes read out of the storage medium, but also by an Operating System (OS) or the like which is working on the computer and executes a part or the whole of the actual processing in accordance with instructions from the program codes, thereby realizing the functions of the above-described embodiments.

Further, the present invention involves such a case in which the program codes read out of the storage medium are written in a memory provided in a function add-on card inserted in the computer or a function add-on unit connected to the computer, and a CPU or the like incorporated in the function add-on card or unit executes a part or the whole of the actual processing in accordance with instructions from the program codes, thereby realizing the functions of the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image data processing method comprising the steps of:
   determining whether image data has a value outside a standard color space;
   converting the image data using a first conversion table when the image data is within the standard color space, and reproducible by a printer, and the said converting also using a second conversion table when the image data is outside the standard color space and reproducible by the printer; and
   outputting the image data converted in said converting step for printing by the printer.

2. An image data processing apparatus comprising:
   means for determining whether image data has a value outside a standard color space;

a first conversion table adapted for use when the image data is within the standard color space and is reproducible by a printer;

a second conversion table adapted for use when the image data is outside the standard color space and is reproducible by the printer;

means for converting the image data using one of said first conversion table and said second conversion table; and means for outputting the image data converted by said converting means for printing by the printer.

3. An image data processing method according to claim 1, wherein said standard color space is an sRGB color space.

4. An image data processing method according to claim 1, wherein said standard color space is a standard color space for an operating system used in a personal computer.

5. An image data processing method according to claim 1, wherein the image data is input from a digital still camera or a digital camcorder.

6. An image data processing apparatus according to claim 2, wherein said standard color space is an sRGB color space.

7. An image data processing apparatus according to claim 2, wherein said standard color space is a standard color space for an operating system used in a personal computer.

8. An image data processing apparatus according to claim 2, wherein the image data is input from a digital still camera or a digital camcorder.

* * * * *